(12) United States Patent
Onozawa

(10) Patent No.: US 7,733,413 B2
(45) Date of Patent: Jun. 8, 2010

(54) IMAGING APPARATUS WITH AUTO-FOCUS FUNCTION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 811 days.

(21) Appl. No.: 11/517,872

(22) Filed: Sep. 8, 2006

(65) Prior Publication Data

US 2007/0052837 A1   Mar. 8, 2007

(30) Foreign Application Priority Data

Sep. 8, 2005   (JP) ............................. 2005-260357

(51) Int. Cl.
*H04N 5/232* (2006.01)
(52) U.S. Cl. ..................... 348/353; 348/350
(58) Field of Classification Search ............... 348/345, 348/349, 350, 351, 353
See application file for complete search history.

(56) References Cited

U.S. PATENT DOCUMENTS

| | | | | |
|---|---|---|---|---|
| 5,258,799 A | * | 11/1993 | Tanii et al. ............... | 396/60 |
| 5,668,597 A | * | 9/1997 | Parulski et al. ............ | 348/350 |
| 5,751,354 A | * | 5/1998 | Suzuki et al. ............. | 348/349 |
| 6,763,187 B2 | * | 7/2004 | Shiraishi .................. | 396/104 |
| 2004/0263633 A1 | * | 12/2004 | Shinohara et al. ......... | 348/207.99 |

FOREIGN PATENT DOCUMENTS

JP   2003-333409 A   11/2003

* cited by examiner

*Primary Examiner*—Jason Chan
*Assistant Examiner*—Nicholas G Giles
(74) *Attorney, Agent, or Firm*—Frishauf, Holtz, Goodman & Chick, P.C.

(57) ABSTRACT

An imaging apparatus includes an image pickup device that converts light from a subject to image data a drive section that drives the image pickup device, an auto-focus section that performs an auto-focus operation, and a focus control section that controls the auto-focus section to perform an auto-focus operation while controlling the drive section so that the image data is read from the image pickup device at a predetermined read out cycle suitable for displaying a through image, when the first determination section determines that the shutter button is pressed halfway, and that controls the auto-focus section to perform an auto-focus operation while controlling the drive section so that the image data is read from the image pickup device at a shorter read out cycle than the predetermined read out cycle, when the second determination section determines that the shutter button is fully pressed at once.

26 Claims, 8 Drawing Sheets

THROUGH IMAGE DRIVE

HIGH SPEED DRIVE

IMAGING APPARATUS WITH AUTO-FOCUS FUNCTION

BACKGROUND OF THE INVENTION

1. Field of the Invention

The present invention relates to an imaging apparatus having an auto-focus function usable in a digital camera and relates to an auto-focus control method.

2. Description of the Related Art

An auto-focus processing by a contrast detection method is one of typical methods for bringing a subject into focus. The auto-focus processing by the contrast detection method is as follows; (1) a focus lens is driven from a lens end to a lens end within a drivable range of a lens; (2) a contrast component is detected from an imaging signal, which is a CCD output at this time, and (3) its waveform is interpreted, thereby moving a lens to a lens position having a highest frequency component in order to achieve focus.

Accordingly, the speed of auto-focus processing by the contrast detection method depends on a cycle speed in which the image data is read out from the CCD (read out cycle). If the read out cycle is short, the time required for auto-focus processing becomes short, accordingly.

There are two typical ways to drive the CCD for performing auto-focus processing by the contrast detection method. One is to drive the CCD in a same way as the case when a general through image is displayed. The other is to drive the CCD in such a way so that the electrical charges loaded to the pixels of the CCD are read only from a specified area (specified are being smaller than the entire CCD area).

When the CCD is driven in the same way as the case when the general through image is displayed, the time necessary for performing auto-focus processing is not shortened. However, there is an advantage in that the through image of a subject can be displayed in real time even when auto-focus processing is performed (see FIG. 2A).

On the other hand, when the CCD is driven in such a way that the image data is read only from the specified area, it is possible to reduce the amount of pixel data to be transferred. This makes it possible to increase the frame rate and to shorten the time necessary for auto-focus processing. On the contrary, there is a disadvantage in that the through image of the subject cannot be displayed when auto-focus processing is being performed (see FIG. 2B).

For this reason, there has emerged a new technique that achieves both the advantages of reducing the auto-focus processing time and displaying through image when performing auto-focus processing is being performed. In this technique, the CCD is driven in such a way so that only the image data read out from the specified area of the CCD is displayed in real time when auto-focus processing is performed. On the other hand, images obtained in the past are displayed for area other than the specified area (for example, see Unexamined Japanese Patent Publication No. 2003-333409).

SUMMARY OF THE INVENTION

According to one aspect of the present invention, there is provided an imaging apparatus including an image pickup device that converts light from a subject to image data; a drive section that drives the image pickup device; an operable shutter button that is capable of being halfway pressed and fully pressed; a first determination section that determines whether the shutter button is pressed halfway; a second determination section that determines whether the shutter button is fully pressed at once; an auto-focus section that changes length of an optical path step by step, that obtains an auto-focus evaluation value based on image data read from the image pickup device when the length of the optical path is changed, and that controls the length of the optical path to provide a highest auto-focus evaluation value among the obtained auto-focus evaluation values to perform an auto-focus operation on the subject, and a focus control section that controls the auto-focus section to perform an auto-focus operation while controlling the drive section so that the image data is read from the image pickup device at a predetermined read out cycle suitable for displaying a through image, when the first determination section determines that the shutter button is pressed halfway, and that controls the auto-focus section to perform an auto-focus operation while controlling the drive section so that the image data is read from the image pickup device at a shorter read out cycle than the predetermined read out cycle, when the second determination section determines that the shutter button is fully pressed at once.

According to another aspect of the present invention, there is provided an imaging apparatus including a first image pickup device that converts light from a subject to image data; a second image pickup device that coverts light from a subject to image data; a first drive section that drives the first image pickup device; a second drive section that drives the second image pickup device; a first auto-focus section that changes length of an optical path step by step, that obtains an auto-focus evaluation value based on image data read from the second image pickup device when the length of the optical path is changed, and that controls the length of optical path of light from the subject being incident on the second image pickup device to provide a highest auto-focus evaluation value among the obtained auto-focus evaluation values to perform an auto-focus operation on the subject; and a first control section that controls the first drive section so that the image data is read from the first image pickup device at a predetermined read out cycle suitable for displaying a through image; and that controls the first auto-focus section to perform an auto-focus operation while controlling the second drive section so that the image data is read from the second image pickup device at a shorter read out cycle than the predetermined read out cycle.

According to still another aspect of the present invention, there is provided an auto-focus control method of an imaging apparatus having an image pickup device that converts light from a subject to image data; a drive section that drives the image pickup device; and an operable shutter button that is capable of being halfway and fully pressed. The method includes a first determination step of determining whether the shutter button is pressed halfway; a first focus control step of performing an auto-focus operation while controlling the drive section, so that the image data is read from the image pickup device at a predetermined read out cycle which is suitable for displaying a through image, when it is determined in the first determination step that the shutter button is pressed halfway; a second determination step of determining whether the shutter button is fully pressed at once; and a second focus control step of performing an auto-focus operation while controlling the drive section, so that the image data is read from the image pickup device at a shorter read out cycle than the predetermined read out cycle, when it is determined in the second determination step that the shutter button is fully pressed at once.

According to still another aspect of the present invention, there is provided an auto-focus control method of an imaging apparatus, having a first image pickup device that converts light from a subject to image data; a second image pickup device that coverts light from a subject to image data; a first drive section that drives the first image pickup device; and a second drive section that drives the second image pickup device. The method includes a first control step of controlling the first drive section so that the image data is read from the first image pickup device at a predetermined read out cycle which is suitable for displaying a through image; and a second control step of performing an auto-focus operation while controlling the second drive section in parallel with the control by the first control step, so that the image data is read from the second image pickup device at a shorter read out cycle than the predetermined read out cycle.

According to still another aspect of the present invention, there is provided a computer-readable recording medium storing a program for a computer of an imaging apparatus including an image pickup device that converts light from a subject to image data; a drive section that drives the image pickup device; and an operable shutter button that is capable of a being halfway pressed and a fully pressed. The program controls the computer to perform a first determination process of determining whether the shutter button is pressed halfway; a second determination process of determining whether the shutter button is fully pressed at once; an auto-focus process of changing length of an optical path step by step, obtaining an auto-focus evaluation value based on image data read from the image pickup device when the length of the optical path is changed, and controlling the length of the optical path to provide a highest auto-focus evaluation value among the obtained auto-focus evaluation values to perform an auto-focus operation on the subject; and process of performing the auto-focus process while controlling the drive section so that the image data is read from the image pickup device at a predetermined read out cycle suitable for displaying through image when it is determined in the first determination process that the shutter button is pressed halfway, and performing an auto-focus operation by controlling the drive section so that the image data is read from the image pickup device at a shorter read out cycle than the predetermined read out cycle, when it is determined in the second determination process that the shutter button is fully pressed at once.

According to still another aspect of the present invention, there is provided a computer-readable recording medium storing a program for a computer of an imaging apparatus comprising a first image pickup device that converts light from a subject to image data; a second image pickup device that coverts light from a subject to image data; a first drive section that drives the first image pickup device; and a second drive section that drives the second image pickup device. The program controls the computer to perform a first auto-focus process of changing length of an optical path, step by step, obtaining an auto-focus evaluation value based on image data read from the second image pickup device when the length of the optical path is changed, and controlling the length of optical path of light from the subject being incident on the second image pickup to provide a highest auto-focus evaluation value among the obtained auto-focus evaluation values, to perform an auto-focus operation on the subject; and a process controlling the first drive section so that the image data is read from the first image pickup device at a predetermined read out cycle suitable for through image display, and performing first auto-focus process by controlling the second drive section so that the image data is read from the second image pickup device at a shorter read out cycle than the predetermined read out cycle.

BRIEF DESCRIPTION OF THE DRAWINGS

These objects and other objects and advantages of the present invention will become more apparent by the following detailed description and the accompanying drawings in which.

DETAILED DESCRIPTION OF THE PREFERRED EMBODIMENTS

The following will specifically explain the embodiments of the present invention to which a digital camera is applied by way of example with reference to the drawings.

First Embodiment

A. Configuration of Digital Camera

Figure 1:
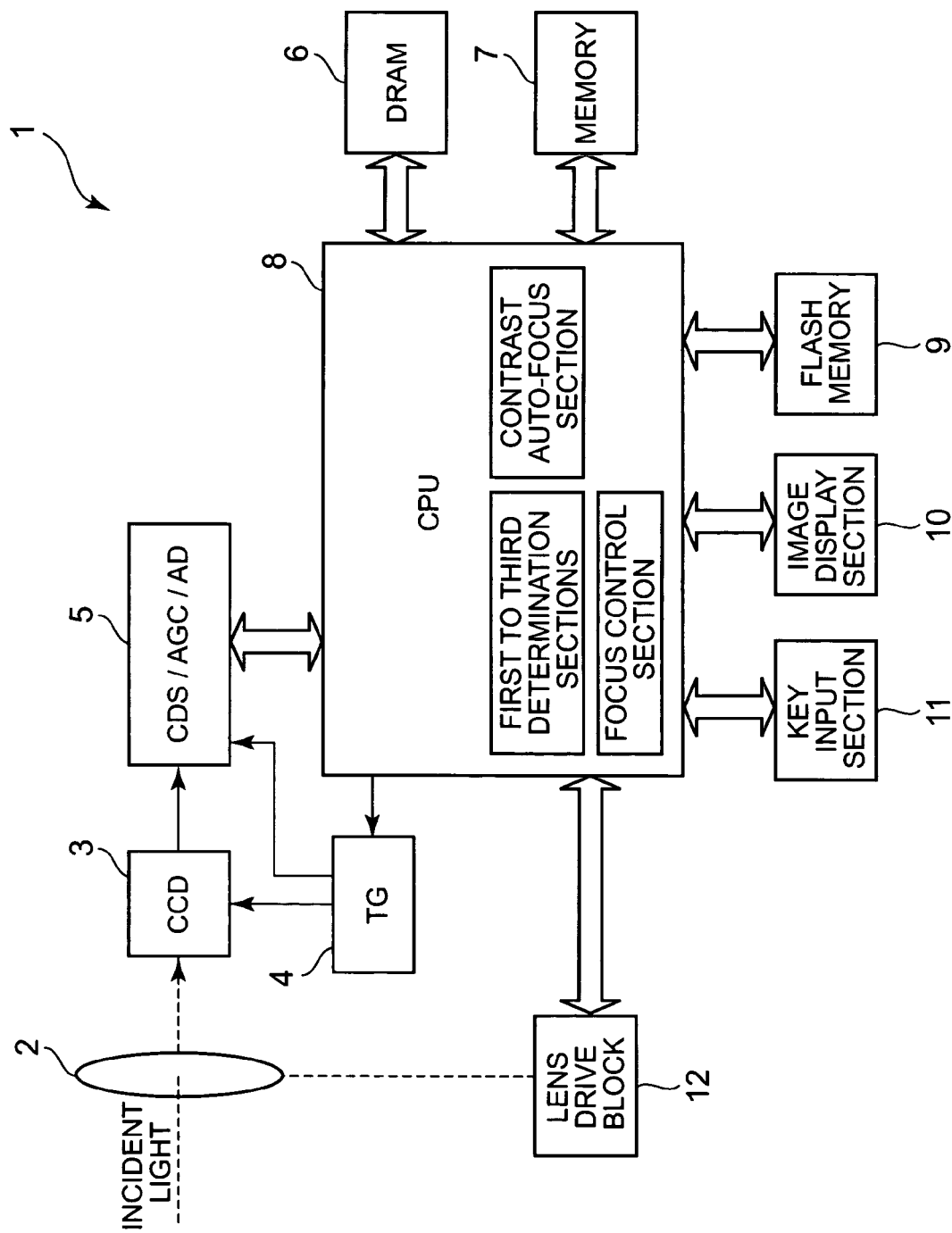
FIG. 1 is a block diagram illustrating a digital camera 1 according to a first embodiment of the present invention.

FIG. 1 is a block diagram illustrating a schematic configuration of a digital camera 1 that implements the imaging apparatus of the present invention.

The digital camera 1 includes a shooting lens 2, a CCD 3, a TG (Timing Generator) 4, a unit circuit 5, a DRAM 6, a memory 7, a CPU 8, a flash memory 8, an image display section 10, a key input section 11, and a lens drive block 12.

The shooting lens 2 includes a focus lens and a zoom lens (both not shown in the figure), and a lens drive block 12 is connected thereto. The lens drive block 12 includes a focus motor and a zoom motor that drive the focus lens and the zoom lens (both not shown), respectively, in a direction of an optical axis, and a focus motor driver and a zoom motor driver that drives the focus motor and zoom motor, respectively, in the direction of the optical axis according to a control signal from the CPU 8.

The CCD 3 converts light from a subject being incident on the CCD 3 via the shooting lens 2, to an electrical signal and outputs the signal (imaging signal) to the unit circuit 5. The CCD 3 is driven according to a timing signal with a predetermined frequency generated by the TG 4.

The TG 4 is connected to the unit circuit 5. The unit circuit 5 includes a CDS (Correlated Double Sampling) circuit that performs CDS on the imaging signal outputted from the CCD 3 and holds the sampled signal, an AGC (Automatic Gain Control) circuit that performs AGC on the sampled imaging signal, and an A/D converter that converts the analog imaging signal subjected to AGC to a digital signal. The imaging signal from the CCD 3 is sent to the CPU 8 as digital signal, via the unit circuit 5.

The CPU 8 is a one-chip microcomputer that controls each section of the digital camera 1. The CPU 8 has functions, such as performing image processing (pixel interpolation processing, γ correction, generation of luminance and color difference signals, white balance processing, exposure compensation processing, etc.) to the image data sent from the unit circuit 5, recording the image data, controlling the drive of the CCD 3, and controlling auto-focus processing using a contrast detection method. Further, the CPU 8 includes a clock circuit, which keeps track of date and time and which functions as a timer.

The memory 7 stores a control program and data necessary for controlling each section of the CPU 8 (for example, control program necessary for auto-focus processing) and the CPU 8 operates according to this control program. It should be noted that the CPU 8 also functions as first to third determination sections of the present invention, a contrast auto-focus section, and a focus control section.

The DRAM 6 is used as a buffer memory that temporarily stores image data sent to the CPU 8 after an image data is obtained by the CCD 3. The DRAM 6 is also used as a working memory for the CPU 8.

The flash memory 9 is a storage medium that stores image data obtained by the CCD 3.

The image display section 10 includes a color LCD and its drive circuit. The image display section 10 displays a subject, which is an image obtained by the CCD 3, when the camera is in shooting standby mode (through image displaying). Upon displaying a recorded image, the image display section 10 displays the image, which is read from the storage flash memory 9 and is then decompressed.

The key input section 11 includes multiple operation keys such as a shutter button that can be halfway and fully pressed, a mode switching key, directional keys, a set key, and the like, and outputs an operation signal, which corresponds to a user key operation, to the CPU 8.

B. The Following Will Explain the Way in which the CCD 3 is Driven, which is a Characteristic of the Present Invention.

Charges accumulated on all pixels of the CCD 3 are read according to a timing signal with a predetermined frequency generated by the TG 4. Here, the way the CCD 3 is driven, differ between through image displaying, normal auto-focus processing, and high-speed auto-focus processing. The TG 4 changes the way, in which CCD 3 is driven according to a control signal from the CPU 8.

It should be noted that auto-focus processing by a contrast detection method is used for auto-focus processing.

B-1 Through Image Displaying and Normal Auto-Focus Processing of the Subject

In displaying through image and in performing normal auto-focus processing, image data is read out from CCD 3 in a way that is suitable for displaying a through image on the image display section 10 (hereinafter referred to as through image drive).

In through image drive, charges accumulated on all pixels of the CCD 3 can be read line after line. However, it requires much time to read out all charges accumulated on all pixels of the CCD 3. Also, when resolution of image data obtained by the CCD 3 is higher than that of the image display section 10, it is desirable that the image size obtained by the CCD 3 should correspond to the resolution of the image display section 10, instead of displaying the obtained image data by decreasing its resolution. Thus, pixel data may be decimated or may be added when being read out. This shortens the read out cycle of the image data as compared with the case when the charges on all pixels are read. As a result, it is possible to smoothly display the through image and to shorten the time necessary for auto-focus processing.

B-2. High-Speed Auto-Focus Processing

In high speed auto-focus processing, in order to shorten the time needed for auto-focus processing, the CCD 3 is driven in such a way to speed up the cycle of reading out the image data accumulated on the CCD. The way in which the CCD 3 is driven in order to speed up the read out cycle is hereinafter referred to as high speed drive.

The following are some of the high-speed driving methods.

B-2a. Partial Reading Drive

In partial reading drive, CCD 3 is driven in such a way so that pixel data of a specified area of the CCD 3 is read out (specified area being smaller than the entire area of CCD 3 and which includes a focus area) as explained in the prior art.

Here, the specified area corresponds to one third of all lines of the CCD 3, which are located in the central area of the CCD 3. Note that also in partial reading drive, pixel data may be read from the specified area of CCD 3, using decimation or pixel addition, in a similar manner as the case of through image drive.

Figure 2A:
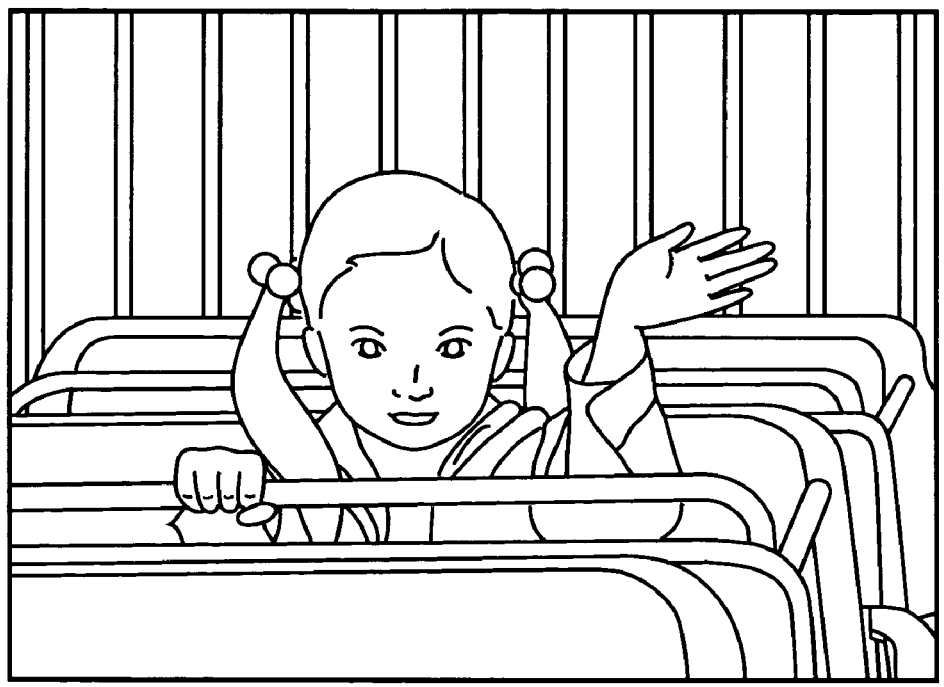
FIGS. 2A and 2B illustrate an image data read by through image drive and high speed drive, respectively.
Figure 2B:
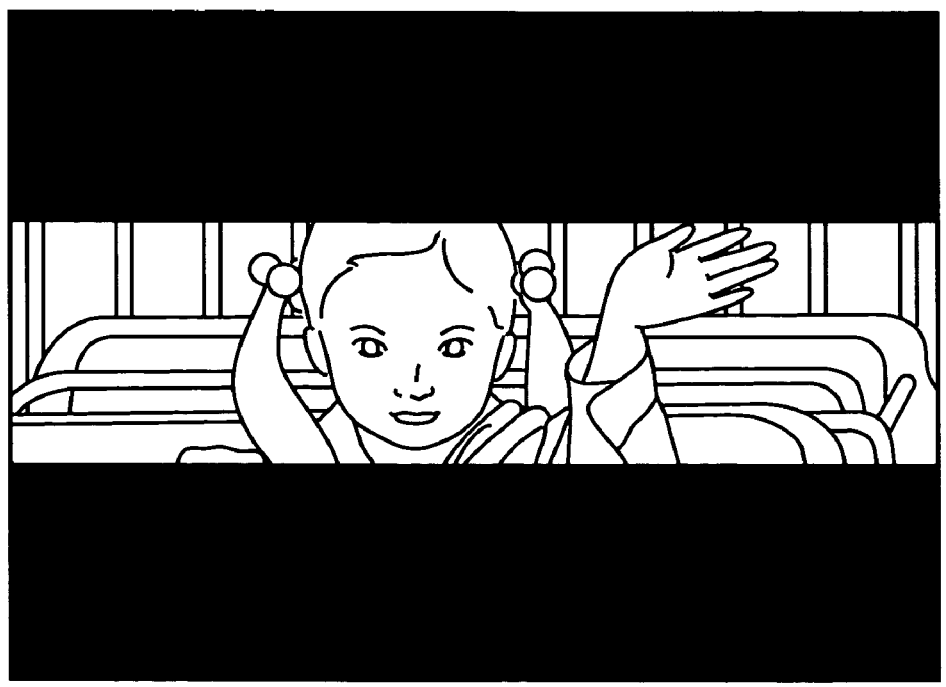

FIG. 2A illustrates an image data read by the through image drive. FIG. 2B illustrates an image data read by the partial reading drive.

As is obvious from FIG. 2, pixel data accumulated on the pixels of CCD 3 over the whole range is read out according to the through image drive. On the other hand, according to the partial reading drive, pixel data accumulated on the pixels in the specified area of the CCD 3 is read.

According to partial reading drive, since pixel data of the specified area (one third of the whole area) is read out, it is possible to increase the frame rate by three times as compared with the case of the through image drive and to largely shorten the time needed for auto-focus processing (when through image drive is performed using decimation or pixel addition when reading out an image data, it should be compared with the partial reading drive that is performed by reducing the pixel data to a same degree).

B-2b. Pixel Addition Drive

In pixel addition drive, charges accumulated on the pixels of the CCD 3 are added before being read out. Since this is an already known technique, its explanation will be omitted.

It has been explained that in through image drive, pixel addition may be performed before the charges accumulated on the pixels are read out. In pixel addition drive explained here, the charges accumulated on the pixels are added to a degree that is not suitable for through image display.

If addition of up to five pixels is suitable for through image display, the CCD is driven in such a way that six or more pixels are added. When the charges accumulated on six or more pixels are added, the resolution is decreased and the result becomes unsuitable for through image display, but the frame rate can be increased. In other words, priority is placed on the frame rate rather than the quality of through image display.

For example, in through image drive, charges accumulated on each two pixels may be added, and in high speed drive (pixel addition drive), charges accumulated on each eight pixels may be added before the pixels are read out. In this case, the frame rate in the high speed drive is four times as high as that in the through image drive.

B-2c. Others

Methods for obtaining greater frame rates in high-speed auto-focus processing, are not limited to partial reading drive and pixel addition drive. Other methods, such as pixel decimation, may be used as well. Partial reading drive and pixel addition drive may be combined to increase the frame rate. In other words, any method that will increase the frame rate may be used.

C. Next, a Comparison Will be Made Between Auto-Focus Processing in the Through Image Drive and Auto-Focus Processing in the High Speed Drive.

First, in auto-focus processing by the contrast detection method, the focus lens is moved to one of the lens end positions, and (1) image data of CCD 3 is read and (2) an auto-focus evaluation value is obtained based on image data within the focus area of the read image data. Then, the focus lens is moved by one step and operations (1) and (2) are performed. Then again, the focus lens is moved by one step and the same operation is repeated.

Since the auto-focus evaluation value is calculated based on high frequency components included in the imaging signal read out from the CCD, the higher the auto-focus evaluation value at the lens position (an optical path length) of the focus lens, the sharper the focus is adjusted.

As mentioned above, the focus lens is moved one step at a time from one lens end to the other lens end (i.e., the length of the optical path is changed) and the image data of the CCD 3 at that time is read so that the auto-focus evaluation value at each focus lens position (each optical path length) is obtained. Then the focus lens is moved to the lens position with the highest auto-focus evaluation value obtained. Note that the search of the auto-focus evaluation value may be ended when the highest auto-focus evaluation value is obtained and the focus lens may be then moved to the lens position providing the highest auto-focus evaluation value.

Since the auto-focus evaluation value at each lens position between one lens end and the other lens end is obtained, the range from one lens end to the other lens end (the range of the length of the optical path) is referred to as a search range.

Figure 3:
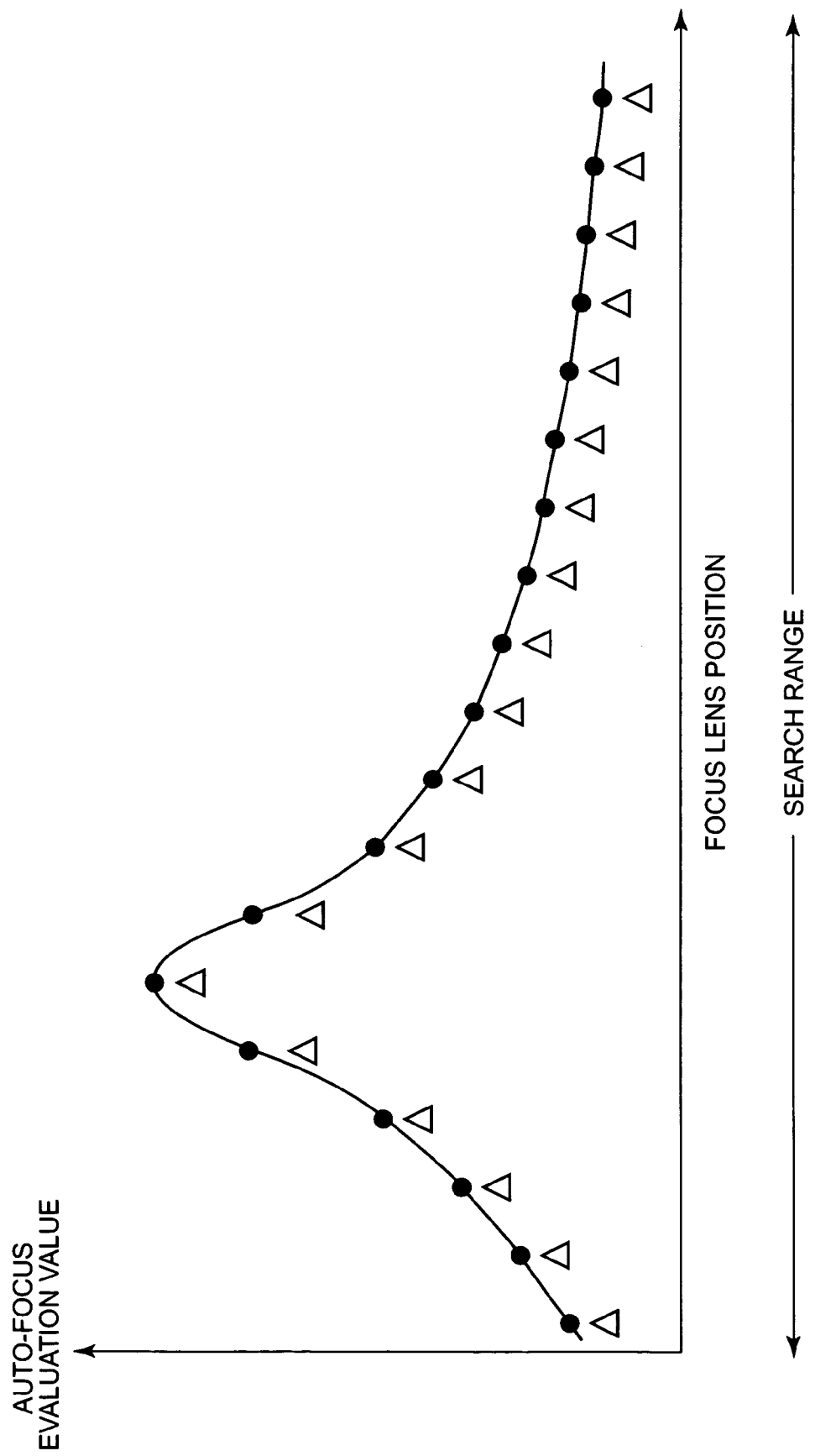
FIG. 3 is a graph illustrating a relationship between each lens position and an auto-focus evaluation value.

FIG. 3 is a graph showing a relationship between each lens position and the auto-focus evaluation value. The small triangles indicate the lens positions of the focus lens where the respective auto-focus evaluation values are obtained (positions where CCD 3 is driven).

The same process as mentioned above is performed in both auto-focus processing in the through image drive and auto-focus processing in the high speed drive. However, in auto-focus processing in the high speed drive, the read out cycle of image data of CCD 3 is shorter as compared with auto-focus processing in the through image drive. Therefore, focus lens can be moved faster, thereby making it possible to obtain the auto-focus evaluation value at each lens position shown in FIG. 3. In other words, the moving speed of the focus lens is increased by shortening the read out cycle, thereby making it possible to reduce time needed to perform auto-focus processing. For example, if the readying cycle is halved, the moving speed of the focus lens is increased by roughly two times.

Figure 4A:
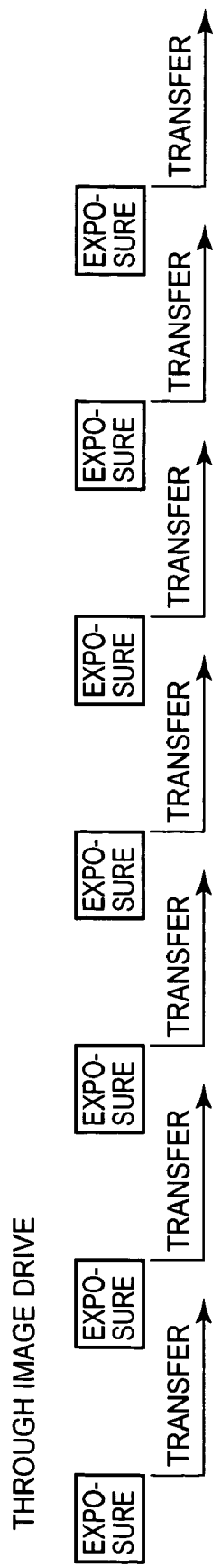
FIGS. 4A and 4B illustrate the read out cycle of an image data in through image drive and high speed drive, respectively.

FIG. 4A shows a read out cycle of image data in the through image drive.

Figure 4B:
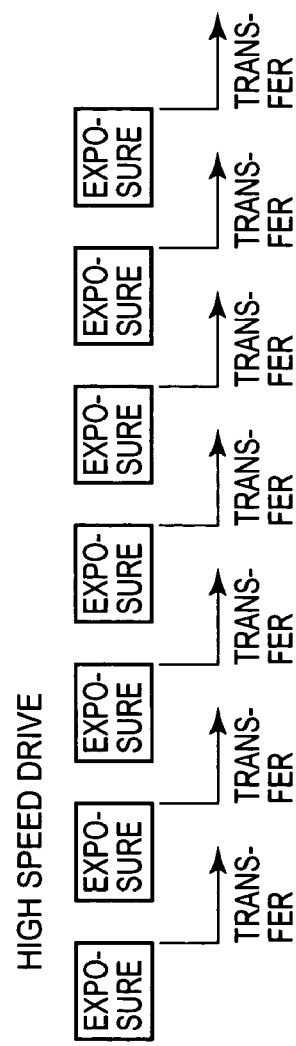

FIG. 4B shows a read out cycle of image data in the high speed drive. Here, it is assumed that the auto-focus evaluation values are obtained at seven different positions (sampling points), within the range from one lens end to another lens ends during auto-focus processing.

As illustrated in FIGS. 4A and 4B, since transfer (reading) of charges accumulated on the CCD 3 in the high speed drive is faster than that in the through image drive, the read out cycle and an exposure cycle becomes shorter for the high speed drive. The moving speed of the focus lens can be increased accordingly, thereby making it possible to obtain the auto-focus evaluation value of each of the above seven sampling points within a short period of time. In other words, since the read out cycle and the exposure cycle are short, the time period in which the focus lens need to be stopped at each sampling point is reduced and thus the focus lens can be immediately moved to the next sampling point.

D. Operation of Digital Camera 1

Figure 5:
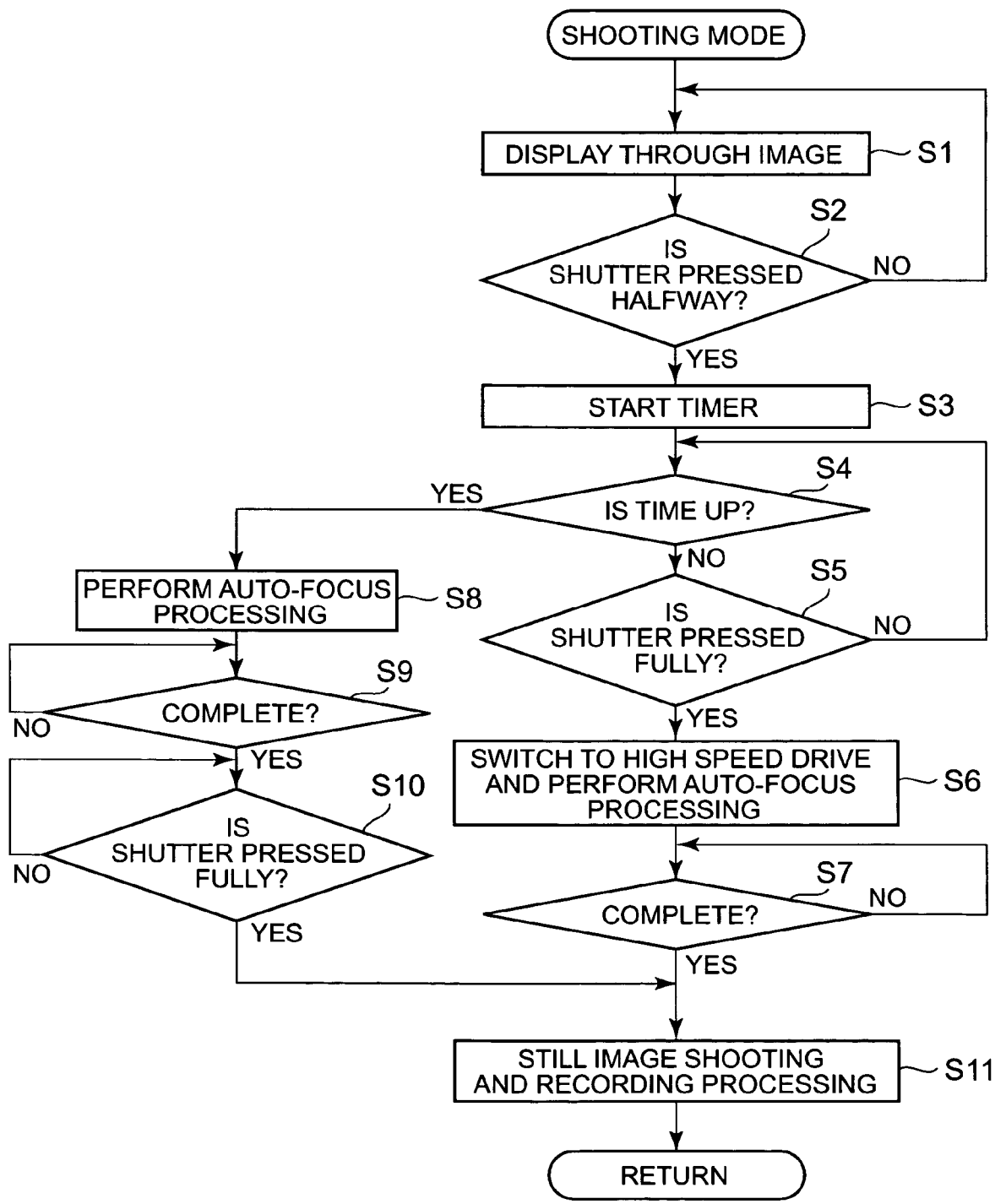
FIG. 5 is a flowchart illustrating an operation of the digital camera 1 according to the first embodiment of the present invention.

Next, an operation of the digital camera 1 will be explained, according to the first embodiment with reference to a flowchart of FIG. 5.

If a mode is set to a shooting mode by the user operating the mode switching key of the key input section 1, the CPU 8 sends a control signal to the TG 4. Image processing is then performed on the image data of the subject output from the CCD 3 and the result is stored to the buffer memory (DRAM 6). The image of the stored image data is displayed on the image display section 10. In other words, through image display is performed (step S1).

Next, the CPU 8 determines whether the shutter button is pressed halfway by the user (step S2). This determination is performed based on whether the operation signal, which corresponds to the user's pressing of the shutter button, is sent from the key input section 11.

If the CPU 8 determines, in step S2 that the shutter button is not pressed halfway, the operation returns to step S1. If the CPU 8 determines, in step S2, that the shutter button is pressed halfway, the CPU 8 starts the timer (step S3).

If the timer is started, the CPU 8 determines whether the time is up (step S4). This is determined based on whether or not a predetermined time (0.1 second in this case) set in the timer has elapsed. The predetermined time may be preset or may be set by the user.

If the CPU 8 determines, in step S4, that time is not up, it then determines whether the shutter button is fully pressed by the user (step S5). This determination is performed based on whether the operation signal, which corresponds to user fully pressing the shutter button, is sent from the key input section 1.

If it is determined in step S5 that the shutter button is not fully pressed, the operation returns to step S4.

If it is determined that the shutter button is fully pressed (Yes in step S5) before it is determined that the predetermined time has elapsed (before 0.1 second elapses after the shutter button is pressed halfway) (No in step S4), the CPU 8 determines that the user has pressed the shutter button fully at once, i.e., the user has requested speedy shooting. Here, the CPU 8 sends the control signal to the TG 4. After that, the CPU 8 switches the CCD 3 from the through image drive to the high-speed drive to execute auto-focus processing by the contrast detection method (step S6). The CCD 3 is switched from the through image drive to the high speed drive, so that the read out cycle of CCD 3 is shortened to speed up auto-focus processing.

When auto-focus processing is executed, the CPU 8 determines whether auto-focus processing is completed, i.e., whether the focus lens is moved to the lens position with the highest auto-focus evaluation value (step S7).

If it is determined in step S7 that auto-focus processing is not completed, the operation waits in step S7 until it is determined that auto-focus processing is completed. At this time, image data formed by the CCD 3 is not displayed on the image display section 10. That is, the through image of the subject is not displayed on the image display section 10. This is because the CCD 3 is driven by high-speed drive. It should be noted that the through image of the subject may be displayed intentionally, knowing that image data is unsuitable for through image display.

On the other hand, if the CPU 8 determines, in step S7, that auto-focus processing is completed, the operation proceeds to step S11. In step S11, still image shooting is performed and the CPU 8 stores the obtained still image data to the flash memory 9. In this still image shooting process, the CCD 3 is driven in such a way that charges on all pixels are read, the still image data read from the CCD 3 is compressed, and the result is stored to the flash memory 9.

On the other hand, if time is up before the shutter button is fully pressed (Yes in step S4), the CPU 8 determines that the user has halfway pressed the shutter button instead of fully pressing at once. That is, the CPU 8 determines that the user does not request speedy shooting. Accordingly, the CPU 8 starts auto-focus processing by the contrast detection method (step S8). In this case, since the CCD 3 is driven by the through image display drive to display the through image on the image display section 10, auto-focus processing time is longer than that in step S6.

When auto-focus processing is executed, the CPU 8 determines whether auto-focus processing is completed (step S9).

If it is determined in step S9 that auto-focus processing is not completed, the operation waits in step S9 until it is determined that auto-focus processing is completed. At this time, the through image of the subject formed by the CCD 3 is displayed on the image display section 10. Since the CCD 3 is driven by the through image driven, image data output from the CCD 3 can be displayed.

If it is determined in step S9 that auto-focus processing is completed, the CPU 8 determines whether the shutter button is fully pressed by the user (step S10).

If it is determined in step S10 that the shutter button is not fully pressed, the operation waits in step S10 (loop of step S10) until the shutter button is fully pressed. In this case as well, the through image of the subject outputted by the CCD 3 is displayed on the image display section 10.

As mentioned above, when the user does not request speedy shooting, priority is placed on the quality of through image display rather than the reduction in auto-focus processing time. This makes it possible for the user to carefully decide the composition of the subject to be shot, without haste.

If it is determined in step S10 that the shutter button is fully pressed, the operation proceeds to step S11. In step S11, still image shooting is performed and the obtained still image data is stored to the flash memory 9.

Here, a condition for determining that the user has pressed the shutter button fully at once is for the shutter button to be fully pressed after the shutter button is pressed halfway, and before a predetermined time elapses. Other determination conditions can be considered on the premise that the CPU 8 will not detect the operation signal, corresponding to halfway pressing of the shutter button, until the shutter button is halfway pressed over a predetermined period of time. In other words, if the operation signal, corresponding to the halfway pressing of the shutter button is detected, it is immediately determined that the user has pressed the shutter button halfway. On the other hand, if only the operation signal, corresponding to the full pressing of the shutter button, is detected without the operation signal, corresponding to halfway pressing of the shutter button, being detected, it is determined that the user has fully pressed the shutter button at once.

More specifically, if it is determined in step S2 that the shutter button is not pressed halfway, the CPU 8 then determines whether or not the shutter button is fully pressed. If it is determined that the shutter button is not fully pressed, the operation returns to step S1. On the other hand, if the operation signal, which corresponds to halfway pressing of the shutter button, is detected, the operation proceeds to step S8. If the operation signal, which corresponds to full pressing of the shutter button, is detected without detecting the operation signal, which corresponds to halfway pressing, the operation proceeds to step S6.

E. As Mentioned Above, According to the First Embodiment, when the Shutter Button is Fully Pressed at Once by the User, it is Determined that the User Requested Speedy Shooting. Since this Drives the CCD 3 in High-Speed Drive, it Makes it Possible to Shorten Auto-Focus Processing Time, and Accordingly, the User is Able to Obtain an Image that Needs to be Shot Speedily.

Furthermore, if the shutter button is not fully pressed at once by the user, it is determined that speedy shooting is not requested. As a result, since the CCD 3 is driven by the through image drive, it is possible to perform the through image display of the subject even during auto-focus processing. Accordingly, the user is able to carefully decide on the composition of the subject to be shot.

Furthermore, since the method for driving the CCD 3 is changed depending on whether the shutter button is fully pressed at once, it is possible to appropriately perform auto-focus processing according to the shooting circumstances.

Furthermore, in the first embodiment, if a predetermined time elapses without the shutter button being fully pressed after the shutter button is pressed halfway (Yes in step S4), auto-focus processing in step S8 is executed. In addition to this, if the shutter button is pressed halfway, the operation may proceed to step S8 immediately to perform auto-focus processing. Then, if it is determined that the shutter button is fully pressed before auto-focus processing is completed, the operation may proceed to step S6 to switch the drive to the high-speed drive and to execute auto-focus processing. In this case, auto-focus processing is not performed from the beginning in high speed drive. Instead, auto-focus processing is continuously performed while the drive is switched from the through image drive to the high speed drive.

In other words, the auto-focus evaluation value at the lens position, which is already obtained by auto-focus processing based on the through image drive, is not obtained twice. Only the auto-focus evaluation values at the lens positions, which are not yet obtained by auto-focus processing based on the through image drive, is obtained by auto-focus processing based on the high-speed drive. The focus lens is moved to the position with the highest auto-focus evaluation value obtained by both the auto-focus processing based on the through image drive and auto-focus processing based on the high speed drive.

Second Embodiment

Next, the second embodiment will be explained.

F. Configuration of Digital Camera

Figure 6:
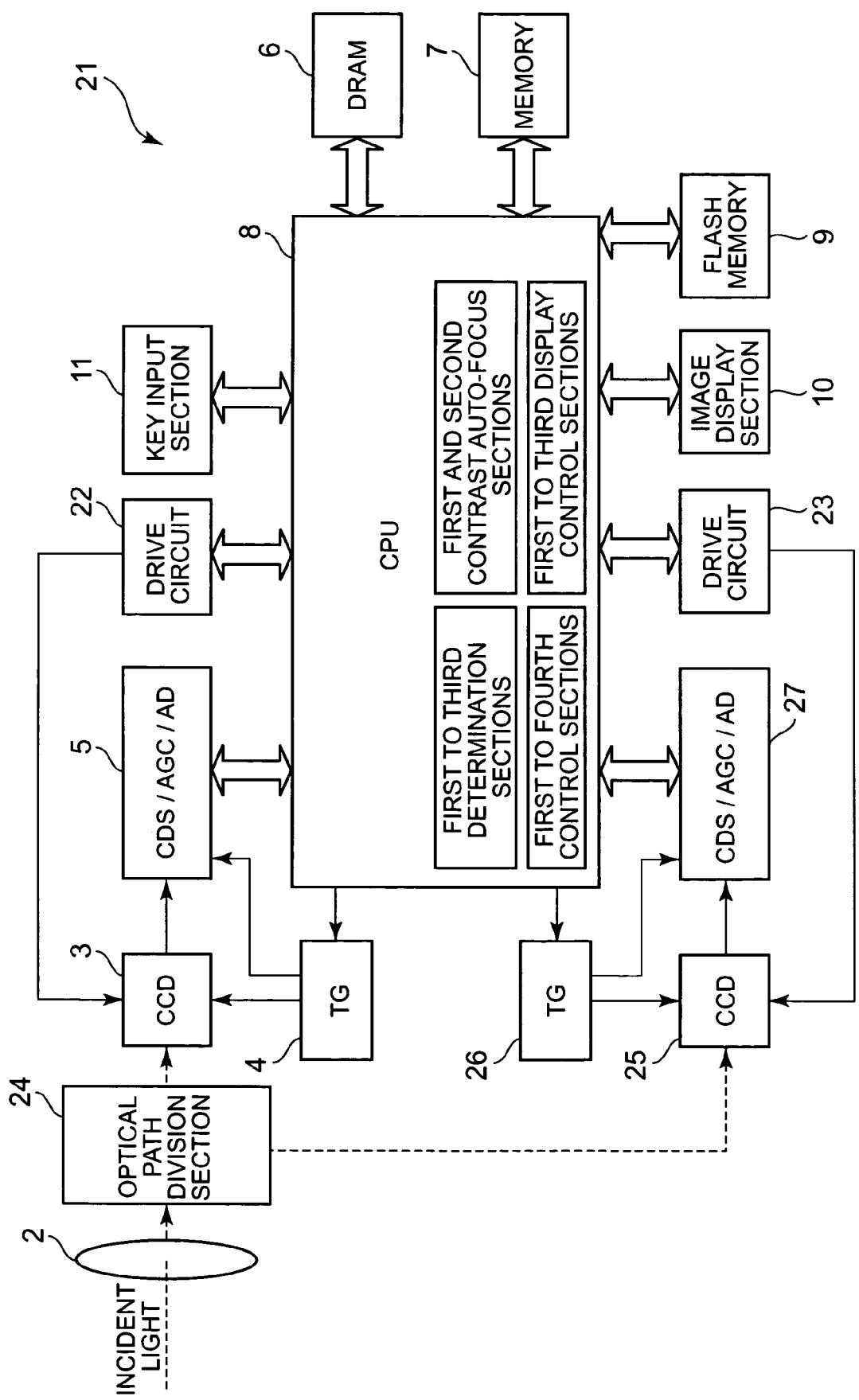
FIG. 6 is a block diagram of a digital camera 21 of a second embodiment of the present invention.

FIG. 6 is a block diagram illustrating a schematic configuration of a digital camera 21 that implements the imaging apparatus of the present invention.

The digital camera 21 of the second embodiment includes a shooting lens 2, a CCD 3, a TG (Timing Generator) 4, a unit circuit 5, a DRAM 6, a memory 7, a CPU 8, a flash memory 8, an image display section 10, a key input section 11, a drive circuit 22, a drive circuit 23, an optical path division section 24, a CCD 25, a TG 26, and a unit circuit 27.

Regarding the same sections as those of the first embodiment, the same reference numerals as those of FIG. 1 are given to the corresponding sections of FIG. 6.

The drive circuit 22 includes a motor and a motor driver to drive the CCD 3 in a direction of the optical axis. The drive circuit 22 drives the CCD 3 in the direction of the optical axis according to the control signal from the CPU 8.

The drive circuit 23 includes a motor and a motor driver to drive the CCD 25 in a direction of the optical axis. The drive circuit 23 drives the CCD 25 in the direction of the optical axis according to the control signal from the CPU 8.

The optical path division section 24 comprises an optical member, such as a prism, a half mirror, etc, that divides a shooting beam into two beams. The two divided shooting beams are projected onto the CCD 3 and the CCD 25, respectively. Here, the optical path division section 24 is provided in such a way that an optical path length, between the shooting lens 2 and the CCD 3, is equal to an optical path length between the shooting lens 2 and the CCD 25, when CCD 3 and CCD 25 are positioned at their reference positions.

The CCD 25, TG 26, and unit circuit 27 have the same functions as those of the CCD 3, TG 4, and unit circuit 5, respectively. Explanations of these and other components are omitted as they have been explained in the first embodiment.

In the first embodiment, the focus lens is moved in the direction of the optical axis to change the optical path length, and the auto-focus evaluation value is obtained, based on the image data obtained, every time the length of the optical path is changed. Rather, in the second embodiment, the focus lens is fixed, and the CCD 3 and CCD 25 are moved in the direction of the optical axis to change the optical path length. In this case, the auto-focus evaluation value is obtained every time the positions of CCD 3 and the CCD 25 are changed. Hence, a same effect as when the focus lens is moved, is achieved. It should be noted that the CPU 8 also functions as first to third determination sections of the present invention, first and second contrast auto-focus sections, first to fourth control sections, and first to third display control sections.

G. Operation of Digital Camera 1

Next, an operation of the digital camera 21 will be explained, according to the second embodiment with reference to a flowchart of FIG. 7.

If a mode is set to a shooting mode by the user operating on the mode switching key of the key input section 11, the CPU 8 sends a control signal to the TG 4 and TG 26. The TG 4 and TG 26 start the through image drive of the CCD 3 and that of CCD 25 according to the sent control signal, respectively (step S51).

The CPU 8 combines two pieces of image data output from the CCD 3 and CCD 25 to generate one piece of image data. The image data thus generated is displayed on the image display section 10 (through image display) (step S52). At this time, the CCD 3 and CCD 25 are placed at their reference positions.

Next, the CPU 8 determines whether the shutter button is pressed halfway by the user (step S53).

If it is determined in step S53 that the shutter button is not pressed halfway, the operation returns to step S52. If it is determined in step S53 that the shutter button is pressed halfway, the CPU 8 starts the timer (step S54).

If the timer is started, the CPU 8 determines whether the time is up (step S55). This determination is performed based on whether or not a predetermined time (0.1 second in this case) set in the timer has elapsed as described in the first embodiment.

If CPU 8 determines in step S55 that the time is not up, it then determines whether the shutter button is fully pressed by the user (step S56).

If it is determined in step S56 that the shutter button is not fully pressed, the operation returns to step S55.

If it is determined that the shutter button is fully pressed before it is determined that the predetermined time elapses (before 0.1 second elapses after the shutter button is pressed halfway) (No in step S55), the CPU 8 determines that the user has pressed the shutter button fully at once, and that, the user requests has requested speedy shooting. In this case, the CPU 8 sends the control signal to the TG 4 and TG 26 to switch the drive of CCD 3 and that of CCD 25 from the through image drive to the high-speed drive and to perform auto-focus processing by the contrast detection method using two CCDs (step S57). It should be noted that the CCDs and not the focus lenses are moved to obtain the auto-focus evaluation value at each optical path length (each position of CCD). Since two CCDs are used, the search range, in which the auto-focus evaluation values are to be obtained is divided into two, and each are apportioned among the two CCDs. Each CCD obtains the auto-focus evaluation values of their apportioned range.

Figure 8:
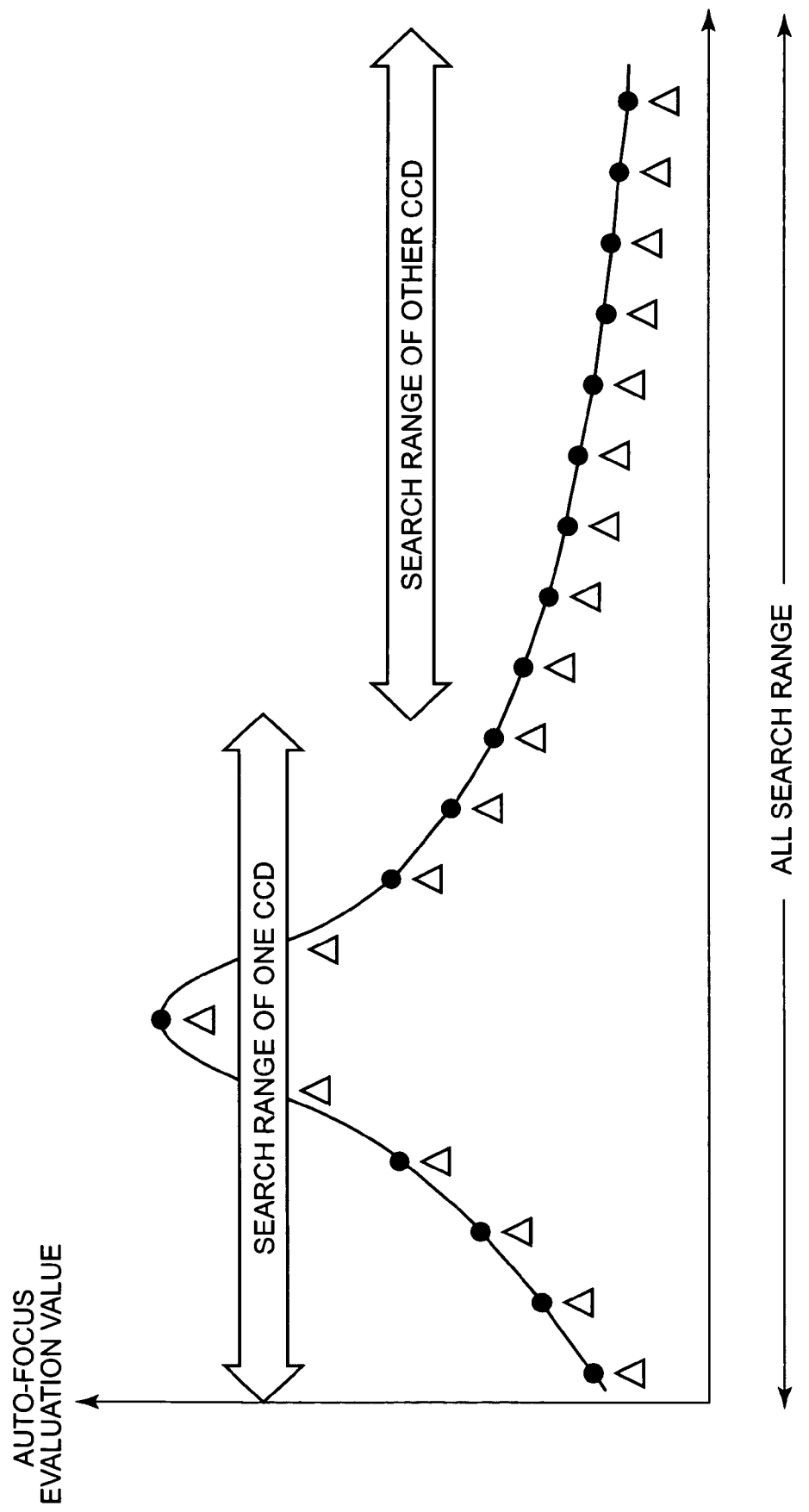
FIG. 8 shows a state in which a search range is divided into two ranges.

FIG. 8 illustrates a state in which the search range is divided into two ranges.

As is obvious from FIG. 8, one CCD obtains the auto-focus evaluation value at each optical path length (each position of CCD) in a left half of the entire search range. The other CCD obtains the auto-focus evaluation value of each optical path length in a right half of the entire search range. Accordingly, each CCD is driven in high-speed while their search range becomes half the size. As a result, auto-focus processing speed becomes twice as fast as that performed in general-high speed drive.

Auto-focus processing completes when CCD 3 and CCD 25 are moved to the positions corresponding to the optical path length providing the highest auto-focus evaluation value among the auto-focus evaluation values obtained using two CCDs. Accordingly, both image data, which are read from the CCD 3 and CCD 25, come in focus.

If auto-focus processing is performed in step S57, the CPU 8 determines whether auto-focus processing is completed in step S58. That is, the CPU 8 determines whether CCD 3 and CCD 25 are moved to the position of CCD corresponding to the optical path length providing the highest auto-focus evaluation value.

If CPU 8 determines in step S58 that auto-focus processing is not completed, the operation waits in step S58 until it is determined that auto-focus processing is completed. Image data outputted by the CCD 3 and CCD 25 is not displayed on the image display section 10. That is, the through image of the subject is not displayed on the image display section 10.

On the other hand, if it is determined in step S58 that auto-focus processing is completed, the CPU 8 performs still image shooting using two CCDs (step S65). The CPU 8 combines the two pieces of still image data read from the two CCDs to generate one piece of still image data, and stores the generated one piece of still image data to the flash memory 9 (step S66).

On the other hand, if the time is up before the shutter button is fully pressed (Yes in step S55), the CPU 8 determines that the user has pressed the shutter button halfway and not fully at once. In other words, the CPU 8 determines that the user does not request speedy shooting. In this case, the CPU 8 sends the control signal to either of TG 4 or TG 26 to change the drive of either the CCD 3 or the CCD 25 from the through image drive to the high-speed drive, and starts auto-focus processing by the contrast detection method using the CCD whose drive is switched to the high-speed drive (step S59). The CCD, whose drive is switched to the high-speed drive, is moved step by step within the whole search range, and the auto-focus evaluation value at each position of the CCD is obtained. CCD 3 and CCD 25 are moved to the position corresponding to the CCD position providing the highest auto-focus evaluation value, and the auto-focus processing completes.

The CPU 8, then displays the image data of the subject outputted from the other CCD, i.e., the CCD, which is driven by the through image drive, on the image display section 10 (step S60). Hence, a through image is displayed using the other CCD.

Next, the CPU 8 determines whether auto-focus processing is completed. In other words, the CPU 8 determines whether CCD 3 and CCD 25 are moved to the position corresponding to the CCD position with the highest auto-focus evaluation value (step S61).

If it is determined in step S61 that auto-focus processing is not completed, the through image of the subject is displayed until it is determined that auto-focus processing is completed (loop from step S60 to step S61). On the other hand, if it is determined in step S61 that auto-focus processing is completed, the drive of the CCD (either one of CCD 3 or CCD 25), which was switched to the high-speed drive, is switched to the through image drive again (step S62).

The CPU 8, then combines two pieces of image data outputted from the CCD 3 and the CCD 25 to generate one piece of still image data. The CPU 8 displays the generated image data on the image display section 10 and performs through image display of the subject (step S63).

After the through image of the combined image data is displayed, the CPU 8 determines whether the shutter button is fully pressed by the user (step S64).

If it is determined in step S64 that the shutter button is not fully pressed, the operation returns to step S63. If it is determined in step S64 that the shutter button is fully pressed, still image shooting is performed using the two CCDs (the CCD 3 and the CCD 25) (step S65). The CPU 8 combines the two pieces of obtained still image data to generate one piece of still image data, and stores the generated one piece of still image data to the flash memory 9 (step S66).

Although explained in the first embodiment, there are several conditions that may determine that the user has pressed the shutter button fully at once. Here, the condition is that the shutter button is fully pressed before a predetermined time elapses after the shutter button is pressed halfway. Other determination conditions may be considered on the assumption that the CPU does not detect the operation signal, corresponding to halfway pressing of the shutter button, until halfway pressing of the shutter button is maintained over a predetermined time. In this case, if the operation signal, corresponding to halfway pressing of the shutter button, is detected, CPU 8 may determine immediately that the user has pressed the shutter button halfway. Furthermore, when CPU 8 detects the operation signal, corresponding to full pressing of the shutter button, and not the operation signal, which corresponds to halfway pressing of the shutter button, it may determine that the user has pressed the shutter button fully at once.

H. As Mentioned Above, According to the Second Embodiment, Two CCDs are Provided.

If the shutter button is not fully pressed at once by the user, it is determined that speedy shooting is not requested. In this case, one of the CCDs is driven in the high speed drive and performs auto-focus processing. On the other hand, the other CCD is driven in the through image drive and displays a through image. This makes it possible to shorten the time necessary for auto-focus processing even when speedy shooting is not requested. Furthermore, it becomes possible to display the through image of the subject even during auto-focus processing.

On the contrary, when the shutter button is fully pressed at once by the user, it is determined that speedy shooting is requested. In this case, the CCD 3 and the CCD 25 are driven in the high speed drive and different search ranges are assigned to the CCD 3 and the CCD 25 to obtain auto-focus evaluation values within the assigned search range. This makes it possible to further shorten the time necessary for auto-focus processing and to obtain an image that needs to be shot speedily.

Since the driving method for the CCD 3 and CCD 5 is changed depending on whether or not the shutter button is fully pressed at once, it is possible to appropriately perform auto-focus processing according to the shooting circumstances.

Furthermore, image data outputted by the CCD 3 and CCD 5 is combined except during auto-focus processing. Thus, even if an amount of light, which is made incident on the CCD 3 and CCD 5, drops by the optical path division section, it is possible to obtain image data with sufficient amount of light.

Figure 7:
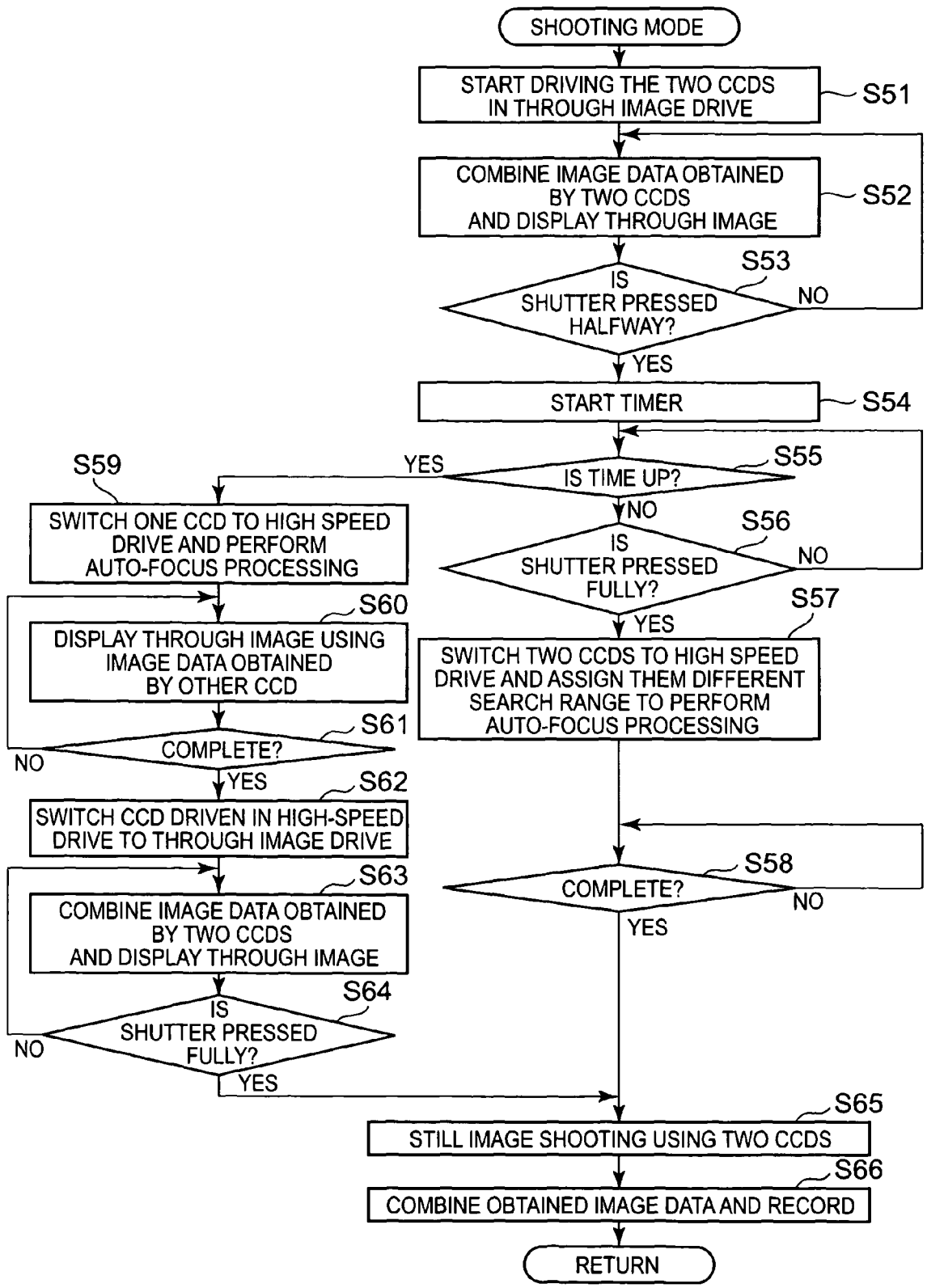
FIG. 7 is a flowchart illustrating an operation of the digital camera 21 according to the second embodiment of the present invention.

Furthermore, in the auto-focus processing in step S57 of FIG. 7 of the second embodiment, the search range is divided into two ranges as shown in FIG. 8. However, the present invention is not limited to this, as long as the search range is apportioned among the two CCDs. The auto-focus evaluation values may be obtained in an alternating manner by the two CCDs. For example, if there are eight positions in which the auto-focus evaluation values are obtained within the search range, one CCD may be moved to obtain the evaluation values at the first, third, fifth, and seventh positions, and the other CCD may be moved to obtain the auto-focus evaluation values at the second, fourth, sixth, and eighth positions.

Furthermore, in the auto-focus processing in step S59 of FIG. 7 of the second embodiment, one CCD, which is driven in the high-speed drive, is moved to obtain the auto-focus evaluation values. However, the focus lens, rather than the CCD, may be moved to obtain the auto-focus evaluation value. In this case, the focus lens is moved to the position providing the highest value among the obtained auto-focus evaluation values, while the CCD 3 and the CCD 25 are positioned at their reference positions. Furthermore, a first focus lens may be provided between the optical path division section 24 and the CCD 3, while a second focus lens may be provided between the optical path division section 24 and the CCD 25. In this case, one of the focus lenses is moved to obtain the auto-focus evaluation values.

Furthermore, in auto-focus processing in step S57 of FIG. 7 of the second embodiment, the two CCDs, which are driven in high-speed drive, are moved to obtain the auto-focus evaluation values. Here, the first focus lens may be provided between the optical path division section 24 and the CCD 3, while at the same time, the second focus lens may be provided between the optical path division section 24 and the CCD 25. In this case, two focus lenses are moved within different search ranges, thereby obtaining the auto-focus evaluation values at different search ranges.

In the first embodiment as well, the CCD 3 may be moved in the direction of the optical axis rather than moving the focus lens.

In the second embodiment, when a predetermined time elapses without the shutter button being fully pressed after CPU 8 determines that the shutter button is pressed halfway (Yes in step S55), auto-focus processing in step S59 is performed. However, auto-focus processing in step S49 may be immediately performed when the shutter button is pressed halfway. In this case, if CPU 8 determines that the shutter button is fully pressed before determining that auto-focus processing is completed, the operation may proceed to step S57 to switch the two CCDs to the high-speed drive and to perform auto-focus processing. Here, the two CCDs do not perform auto-focus processing from the beginning in high-speed drive (step S57). Instead, auto-focus processing is performed in a continuous manner by switching the auto-focus processing in step S59 to the auto-focus processing in step S57.

In other words, the auto-focus evaluation values which is already obtained by auto-focus processing in step S59, are not obtained twice. Only the auto-focus evaluation values which are not yet obtained by auto-focus processing in step S59, is obtained by auto-focus processing in step S57. Next, the CCD 3 and CCD 25 are moved to the positions corresponding to the CCD position providing the highest auto-focus evaluation value obtained by auto-focus processing in step S59 and step S57.

Furthermore, during the through image display, in steps S52 and S63 of FIG. 7 of the second embodiment, image data obtained by the two CCDs is combined to perform through image display. However, through image may be displayed using only one of the two CCDs instead.

Furthermore, in the case when only one of two CCDs is used, the optical path division section 24 may be withdrawn from the optical axis. Since the amount of light is reduced by the optical path division section 24, when image data is not combined, the optical path division section 24 is withdrawn in order to display a clear through image.

Furthermore, in the aforementioned embodiments, the shutter button is a two-stage stroke button that can be both halfway and fully pressed. However, a button that can be operated only in an one-stage manner (a button that can be only fully pressed) may also be used. In this case, a touch sensor is provided to detect whether the user has touched the top of the shutter button. If the CPU 8 detects that the user has touched the touch sensor, it determines that the shutter button is pressed halfway. When the shutter button is pressed down, the CPU 8 determines that the shutter button is fully pressed.

Furthermore, in the aforementioned embodiments, although CCD is used to convert the light from the subject to an imaging signal, any device that is able to convert the light from the subject to an imaging signal may be used.

The digital camera 1 of the present invention is not limited to the aforementioned embodiments. The digital camera 1 of the present invention may take the form of any camera-equipped apparatus, such as camera-equipped cellular phone, camera-equipped personal computer, camera-equipped IC recorder, or digital video camera, etc.

The method described in the aforementioned embodiments can be applied to various camera-equipped apparatuses with a computer, in the form of a program executable by the computer. For example, a program for realizing this method may be written on a recording medium such as a flash memory, a hard disk, a detachable memory card, etc. and be applied to various apparatuses. Alternatively, the program itself may be transmitted via a transmission medium such as a network, etc., and be applied to various apparatuses. Computers of various types may read the program recorded on a recording medium or the program provided via a transmission medium. By this read program controlling the operations, the respective processes are performed and the present method is realized.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-260357 filed on Sep. 8, 2005 and including specification, claims, drawings and summary. The disclosure of the above Japanese Patent Application is incorporated herein by reference in its entirety.

What is claimed is:

1. An imaging apparatus comprising:
an image pickup device that converts light from a subject to image data;
a drive section that drives the image pickup device;
an operable shutter button that is capable of being halfway pressed and fully pressed;
a first determination section that determines whether the shutter button is pressed halfway;
a second determination section that determines whether the shutter button is fully pressed at once;
an auto-focus section that changes a length of an optical path step by step, obtains an auto-focus evaluation value based on image data read from the image pickup device for each changed length of the optical path, and controls the length of the optical path to provide a highest auto-focus evaluation value among the obtained auto-focus evaluation values to perform an auto-focus operation on the subject; and
a focus control section that controls the auto-focus section to perform the auto-focus operation while controlling the drive section so that the image data is read from the image pickup device at a predetermined frame rate suitable for displaying a through image, when the first determination section determines that the shutter button is pressed halfway, and that controls the auto-focus section to perform the auto-focus operation while controlling the drive section to drive the image pickup device in a high speed drive so that the image data is read from the image pickup device at a greater frame rate than the predetermined frame rate, when the second determination section determines that the shutter button is fully pressed at once.

2. The imaging apparatus according to claim 1, wherein the auto-focus section changes the length of the optical path, step by step, at a same cycle as the frame rate of the image pickup device, the frame rate being controlled by the drive section, and obtains auto-focus evaluation value, when the length of the optical path is changed.

3. The imaging apparatus according to claim 1, further comprising:
a third determination section that determines whether the shutter button is fully pressed,
wherein the second determination section determines that the shutter button is fully pressed at once when the third determination section determines that the shutter button is fully pressed, while the auto-focus operation is being performed by the auto-focus section.

4. The imaging apparatus according to claim 1, wherein the second determination section determines that the shutter button is fully pressed at once when the shutter button is fully pressed before a predetermined time elapses after the shutter button is pressed halfway; and wherein the first determination section determines that the shutter button is pressed halfway, when the shutter button is pressed halfway and a predetermined time elapses without the shutter button being fully pressed.

5. The imaging apparatus according to claim 1, wherein the second determination section determines that the shutter button is fully pressed at once when it is determined that the shutter button is fully pressed, while the first determination section does not determine that the shutter button has been pressed halfway.

6. The imaging apparatus according to claim 1, wherein image data of a part of the image obtained by the image pickup device is read out, and/or an added image data, which is obtained by adding a plurality of pixels of the image obtained by the image pickup device, is read out from the image pickup device, when the image pickup device is driven at the greater frame rate than the predetermined frame rate.

7. The imaging apparatus according to claim 1, wherein the auto-focus section changes the length of the optical path by changing positions of the image pickup device or of a focus lens, and obtains the auto-focus evaluation value, when the length of the optical path is changed.

8. An imaging apparatus comprising:
a first image pickup device that converts light from a subject to image data;
a second image pickup device that coverts light from a subject to image data;
a first drive section that drives the first image pickup device;
a second drive section that drives the second image pickup device;
a first auto-focus section that changes a length of an optical path, of light from the subject that is incident on the second image pickup device, step by step, obtains an auto-focus evaluation value based on image data read from the second image pickup device when the length of the optical path is changed, and controls the length of the optical path of light from the subject that is incident on the second image pickup device to provide a highest auto-focus evaluation value among the obtained auto-focus evaluation values to perform an auto-focus operation on the subject; and
a first control section that controls the first drive section so that the image data is read from the first image pickup device at a predetermined frame rate suitable for displaying a through image, and that controls the first auto-focus section to perform the auto-focus operation while controlling the second drive section so that the image data is read from the second image pickup device at a greater frame rate than the predetermined frame rate.

9. The imaging apparatus according to claim 8, further comprising:
an optical path division section that divides the optical path of light from the subject into two optical paths,
wherein the first image pickup device converts to image data, light from the subject from one of the two optical paths; and
wherein the second image pickup device converts to image data, light from the subject from the other of the two optical paths.

10. The imaging apparatus according to claim 8, wherein the first auto-focus section changes the length of the optical path, step by step, at a same cycle as the frame rate of image data from the second image pickup device, the frame rate being controlled by the second drive section, and obtains the auto-focus evaluation value, when the length of the optical path is changed.

11. The imaging apparatus according to claim 8, further comprising:
a first display control section that is controlled by the first control section to display on a display section, as a through image, the image data read from the first image pickup device.

12. The imaging apparatus according to claim 8, further comprising:
an operable shutter button that is capable of being halfway and fully pressed;
a first determination section that determines whether the shutter button is pressed halfway;
a second determination section that determines whether the shutter button is fully pressed at once;
wherein the first control section, when the first determination section determines that the shutter button is pressed halfway, controls the first drive section so that the image data is read from the first image pickup device at the predetermined frame rate, and controls the first auto-focus section to perform the auto-focus operation, while controlling the second drive section so that the image data is read from the second image pickup device at the greater frame rate than the predetermined frame rate.

13. The imaging apparatus according to claim 12, further comprising:
a third determination section that determines whether the shutter button is fully pressed,
wherein the second determination section determines that the shutter button is fully pressed at once when the third determination section determines that the shutter button is fully pressed, while the auto-focus operation is being performed by the first auto-focus section.

14. The imaging apparatus according to claim 12, wherein the second determination section determines that the shutter button is fully pressed at once when the shutter button is pressed fully before a predetermined time elapses after the shutter button is pressed halfway; and wherein the first determination section determines that the shutter button is pressed halfway when the shutter button is pressed halfway, and a predetermined time elapses without the shutter button being fully pressed.

15. The imaging apparatus according to claim 12, wherein the second determination section determines that the shutter button is fully pressed at once when it is determined that the shutter button is fully pressed, while the first determination section does not determine that the shutter button has been pressed halfway.

16. The imaging apparatus according to claim 12, further comprising:
a second auto-focus section that changes a length of an optical path of light from the subject that is incident on the first image pickup device and also changes the length of the optical path of light from the subject that is incident on the second image pickup device, obtains auto-focus evaluation values based on the image data read from the first and the second image pickup devices when the lengths of the optical paths are changed, and controls the lengths of the optical paths of light from the subject that is incident on the first and the second image pickup devices to provide a highest auto-focus evaluation value among the obtained auto-focus evaluation values to perform an auto-focus operation on the subject; and a second control section that controls the second auto-focus section to perform the auto-focus operation, while controlling the first drive section and the second drive section so that the image data is read from the first image pickup device and the second image pickup device, respectively, at the greater frame rate than the predetermined frame rate, when the second determination section determines that the shutter button is fully pressed at once.

17. The imaging apparatus according to claim 16, wherein the second auto-focus section changes the length of the optical path of light that is incident on the first image pickup device at a same cycle as the frame rate at which the image data is read from the first image pickup device, the frame rate being controlled by the first drive section, changes the length of the optical path of light that is incident on the second image pickup device at a same cycle as the frame rate at which the image data is read from the second image pickup device, the frame rate being controlled by the second drive section, and obtains the auto-focus evaluation values based on the image data read from the first and the second pickup devices when the lengths of the optical paths are changed, wherein obtaining of the auto-focus evaluation values is apportioned by the second auto-focus section among the first and the second image pickup devices.

18. The imaging apparatus according to claim 8, further comprising:
a third control section that controls the first and the second drive sections, so that the image data is read from the first and the second image pickup devices, respectively, at the predetermined frame rate which is suitable for displaying a through image display; and
a second display control section that combines the two pieces of image data read, by the control of the third control section, from the first and the second image pickup devices, to display the combined image data on a display section, as a through image.

19. The imaging apparatus according to claim 8, further comprising:
a fourth control section that controls either one of the first image pickup device or the second image pickup device to be driven in the predetermined frame rate which is suitable for displaying the through image, and that stops the other image pickup device from obtaining further image data; and
a third display control section that displays on a display section, the image data read, by the control of the fourth control section, from the image pickup device which is driven in the predetermined frame rate suitable for through image display.

20. The imaging apparatus according to claim 8, further comprising:
a third determination section that determines whether the shutter button is fully pressed; and
a storage control section that combines two pieces of image data read from the first image and the second image pickup devices and stores the combined image data to a storage section when the third determination section determines that the shutter button is fully pressed.

21. The imaging apparatus according to claim 8, wherein image data of a part of the image obtained by the first or second image pickup device is read out, and/or an added image data, which is obtained by adding a plurality of pixels of the image data obtained by the first or second image pickup device, is read out from the first or second image pickup device, when the first or second image pickup device is driven at the greater frame rate than the predetermined frame rate.

22. The imaging apparatus according to claim 8, wherein the first auto-focus section changes positions of the second image pickup device or of a focus lens to change the length of the optical path and obtains the auto-focus evaluation value when the length of optical path is changed.

23. An auto-focus control method of an imaging apparatus, wherein the imaging apparatus comprises (i) an image pickup device that converts light from a subject to image data, (ii) a drive section that drives the image pickup device, and (iii) an operable shutter button that is capable of being halfway and fully pressed, the method comprising:
a first determination step comprising determining whether the shutter button is pressed halfway;
a first focus control step comprising performing an auto-focus operation while controlling the drive section, so that the image data is read from the image pickup device at a predetermined frame rate which is suitable for displaying a through image, when it is determined in the first determination step that the shutter button is pressed halfway;
a second determination step comprising determining whether the shutter button is fully pressed at once; and
a second focus control step comprising performing an auto-focus operation while controlling the drive section, so that the image data is read from the image pickup device at a greater frame rate than the predetermined frame rate, when it is determined in the second determination step that the shutter button is fully pressed at once.

24. An auto-focus control method of an imaging apparatus, wherein the imaging apparatus comprises (i) a first image pickup device that converts light from a subject to image data, (ii) a second image pickup device that coverts light from a subject to image data, (iii) a first drive section that drives the first image pickup device, and (iv) a second drive section that drives the second image pickup device, the method comprising:
a first control step comprising controlling the first drive section so that the image data is read from the first image pickup device at a predetermined frame rate which is suitable for displaying a through image; and
a second control step comprising performing an auto-focus operation while controlling the second drive section in parallel with the control performed in the first control step, so that the image data is read from the second image pickup device at a greater frame rate than the predetermined frame rate.

25. A computer-readable recording medium storing a program for a computer of an imaging apparatus, wherein the imaging apparatus comprises (i) an image pickup device that converts light from a subject to image data, (ii) a drive section that drives the image pickup device, and (iii) an operable shutter button that is capable of a being halfway pressed and a fully pressed, the program being executable by the computer to control the computer to perform processes comprising:
a first determination process comprising determining whether the shutter button is pressed halfway;
a second determination process comprising determining whether the shutter button is fully pressed at once;
an auto-focus process comprising changing a length of an optical path step by step, obtaining an auto-focus evaluation value based on image data read from the image pickup device for each changed length of the optical path, and controlling the length of the optical path to provide a highest auto-focus evaluation value among the obtained auto-focus evaluation values to perform an auto-focus operation on the subject; and a process comprising performing the auto-focus process while controlling the drive section so that the image data is read from the image pickup device at a predetermined frame rate suitable for displaying a through image when it is determined in the first determination process that the shutter button is pressed halfway, and performing the auto-focus process while controlling the drive section to drive the image pickup device in a high speed drive so that the image data is read from the image pickup device at a greater frame rate than the predetermined frame rate, when it is determined in the second determination process that the shutter button is fully pressed at once.

26. A computer-readable recording medium storing a program for a computer of an imaging apparatus, wherein the imaging apparatus comprises (i) a first image pickup device that converts light from a subject to image data, (ii) a second image pickup device that coverts light from a subject to image data, (iii) a first drive section that drives the first image pickup device, and (iv) a second drive section that drives the second image pickup device, the program being executable by the computer to control the computer to perform processes comprising:

an auto-focus process comprising changing a length of an optical path, of light from the subject that is incident on the second image pickup device, step by step, obtaining an auto-focus evaluation value based on image data read from the second image pickup device when the length of the optical path is changed, and controlling the length of optical path of light from the subject that is incident on the second image pickup device to provide a highest auto-focus evaluation value among the obtained auto-focus evaluation values, to perform an auto-focus operation on the subject; and a process comprising controlling the first drive section so that the image data is read from the first image pickup device at a predetermined frame rate suitable for through image display, and performing the auto-focus process while controlling the second drive section so that the image data is read from the second image pickup device at a greater frame rate than the predetermined frame rate.

* * * * *